(12) United States Patent
Morales

(10) Patent No.: US 7,974,852 B2
(45) Date of Patent: Jul. 5, 2011

(54) SYSTEM AND METHOD FOR BULK MAIL ORIENTED TRANSACTION PRINTING

(75) Inventor: Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 231 days.

(21) Appl. No.: 12/323,769

(22) Filed: Nov. 26, 2008

(65) Prior Publication Data

US 2010/0131430 A1 May 27, 2010

(51) Int. Cl.
*G06Q 10/00* (2006.01)
*G06Q 30/00* (2006.01)

(52) U.S. Cl. ................ 705/1.1; 705/330; 705/333

(58) Field of Classification Search .............. None
See application file for complete search history.

(56) References Cited

U.S. PATENT DOCUMENTS

| | | | |
|---|---|---|---|
| 3,858,054 A | 12/1974 | Hutner et al. | 250/556 |
| 4,500,083 A * | 2/1985 | Wong | 270/52.05 |
| 4,601,394 A | 7/1986 | Hutner | 209/3.3 |
| 4,849,884 A | 7/1989 | Axelrod et al. | 364/406 |
| 5,264,665 A * | 11/1993 | Delfer, III | 177/25.15 |
| 5,635,694 A | 6/1997 | Tuhro | 235/375 |
| 5,943,658 A | 8/1999 | Gravell et al. | 705/410 |
| 6,167,326 A | 12/2000 | Graushar et al. | 700/223 |
| 6,250,631 B1 * | 6/2001 | Hanamoto et al. | 271/298 |
| 6,343,360 B1 | 1/2002 | Feinleib | 713/1 |
| 2003/0014376 A1 | 1/2003 | DeWitt et al. | 705/406 |
| 2003/0115162 A1 | 6/2003 | Konick | 705/404 |
| 2005/0008387 A1 * | 1/2005 | Sato | 399/81 |
| 2007/0253029 A1 * | 11/2007 | Yamaguchi | 358/1.18 |
| 2008/0222522 A1 | 9/2008 | Morales | 715/276 |

OTHER PUBLICATIONS

PDL Reference Guide for the Xerox WorkCentre/WorkCentre Pro Series; Xerox Multifunction Devices; Oct. 30, 2007 J. Mongelli; The Digital Dozen; Xerox Corporation, May 2007.

* cited by examiner

*Primary Examiner* — John W Hayes
*Assistant Examiner* — George Chen
(74) *Attorney, Agent, or Firm* — Kermit D. Lopez; Luis M. Ortiz; Ortiz & Lopez, PLLC

(57) ABSTRACT

A system and method for bulk mail oriented transaction printing of variable documents by evaluating particular data such as zip code data in a VI PDL. A queue can be configured with information regarding a particular rendering job, which includes the VI data fields including required postal information, a particular postal information format, and a thickness adjustment with respect to each item of mail associated with a bulk mail. The rendering job can be received for production and a number of records associated with the job automatically parsed into one or more postal bundles, based on predefined information and postal regulations. Such an approach can also be utilized to automatically generate and render the required bundle labels.

20 Claims, 5 Drawing Sheets

US 7,974,852 B2

SYSTEM AND METHOD FOR BULK MAIL ORIENTED TRANSACTION PRINTING

TECHNICAL FIELD

Embodiments are generally related to data-processing systems and methods. Embodiments are additionally related to the field of computers and similar technologies and, in particular, to software utilized in this field. In addition, embodiments also relate to automated methods and systems for bulk mail oriented transaction printing.

BACKGROUND OF THE INVENTION

Bulk mail accounts for a significant portion of the mail delivered by shipping organizations such as the United States Postal Service (USPS). Bulk rate mail discounts are provided by the USPS to organizations that prepare mail in a manner that minimizes mail handling at post office processing stations. Pieces of processed mail must be bundled according to USPS sorting rules and must also meet certain criteria set forth in various postal regulations in order to qualify for reduced rates. In an effort to lower such bulk mail operating costs, however, and also increase value for their customer base, many organizations and businesses typically prepare packages and other items utilizing automated equipment that presorts and labels the items prior to placement of the items into the delivery system, Users may realize cost savings due to such presorting and processing approaches. For example, many delivery system operators provide discounts on presorted items as the amount of sorting necessary by the delivery system operator is reduced.

Typical methods for separating of pieces of mail into bulk mail bundles are manual in nature. The pieces are manually sorted after labels have been applied to the mail. Such labels may include each of the necessary designations to determine the appropriate bulk mail criteria into which they fall. Another common manual technique involves manually determining the particular bundle into which each piece of mail piece is placed and coding each address record as such so that a computer printed address label ultimately appears in the bulk mail sequence. Because such methods are manual in nature, they do not provide for the efficient processing of bulk mail oriented transactions. Some prior art methods have attempted to solve such problems utilizing data sorting software. Such software provides a number of options for data sorting and typically does comply with USPS regulations; however, these techniques are limited in their sorting and delivery efficiencies.

Based on the foregoing, it is believed that a need exists for an improved bulk mailing production system and method that ensures postal regulation compliance in the printing of variable documents by evaluating particular data (e.g., zip code) and then processing such data for improved efficiencies in the delivery of correspondence.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for a method, system and computer-usable medium for implementing bulk mail oriented transaction printing based on postal regulation compliance.

It is, yet a further aspect of the present invention to provide for a method for automatically generating a cover sheet for sorted postal bundle that can be tailored to specific postal requirements.

The aforementioned aspects and other objectives and advantages can now be achieved as described herein. A system and method for bulk mail oriented transaction printing of variable documents by evaluating a postal data (e.g., zip code) in a VI PDL is disclosed. Note that as utilized herein, the acronym PDL generally refers to "Print Description Language" and the acronym VI generally refers to "Variable Information".

A queue can be configured with information regarding a rendering job such as, for example, a rendering job (e.g., print job) which can include the VI data fields including required postal information, a postal information format, and a thickness adjustment for each item of mail associated with a bulk mail. The print job can be received for production and a number of records associated with the job automatically parsed into one or more postal bundles, based on the predefined information and postal regulations. The disclosed approach can also be employed to automatically generate and rendering (e.g., print) the required bundle labels.

The predefined information about the print job can be utilized to determine a much more accurate number of records for a given bundle. Such an approach enables each bundle to contain a maximum number of pieces based on thickness. The leftovers and partial bundles can be combined into a single, coarser bundle. The VI records can be printed in an order other than the order specified in the VI PDL in order to enable the dynamic creation of the coarser bundles. The bundles of finest granularity can be rendered in an order in which they appear in the PDL.

The coarser bundle and other non-adjacent records can be concurrently tracked and printed as soon as possible, but not between the finer granularity bundles that are going to the same destination. In addition, a collection of VI records as a single unit can be tracked and the unit can be treated as an independent print job. The records that do not fit into the smallest granularity bundle can be withheld to determine whether they are capable of being bundled with other non-adjacent records into the coarser bundle. Further, the end of job demarcation at the bundle boundary (e.g. offset, slip sheet, cover sheet, etc.) can be performed in order to simplify the mailroom workflow.

A stack can then be generated with clearly demarcated postal bundles and the finished stacks can be placed in the mail independently of other stacks in the overall job. Such an approach reduces mailing costs as the number of pieces on each bundle is not fixed, but rather varies with the variability in the thickness of the mail pieces and by combining small bundle "leftovers" into larger bundles. Further, the printed bundles that go into a bindery are independent of each other and the bindery does not need to ensure retention of a FIFO print order, which simplifies bindery operations and mailroom workflow. Also, the mailroom does not need to collate post office cover sheets into the mail bundles.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
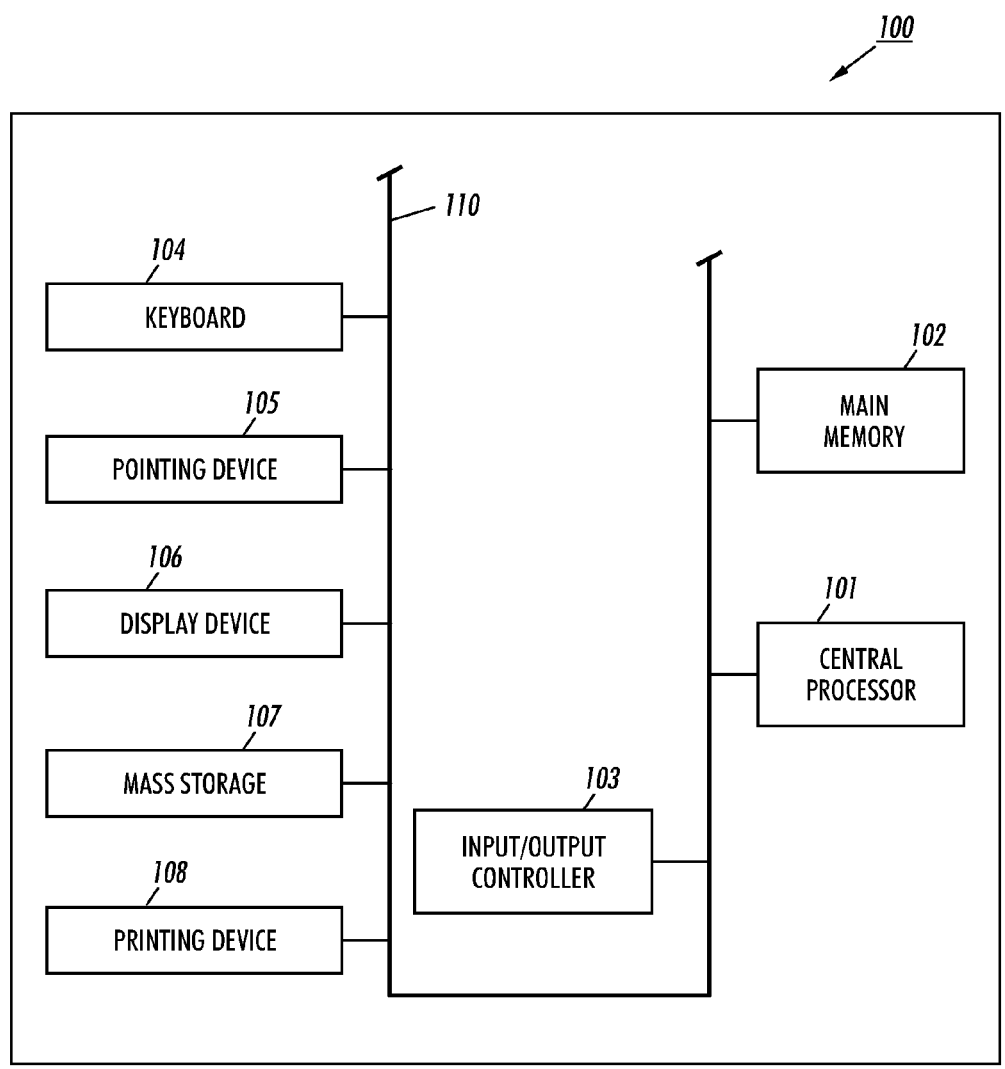
FIG. 1 illustrates a schematic view of a computer system in which the present invention may be embodied.
Figure 2:
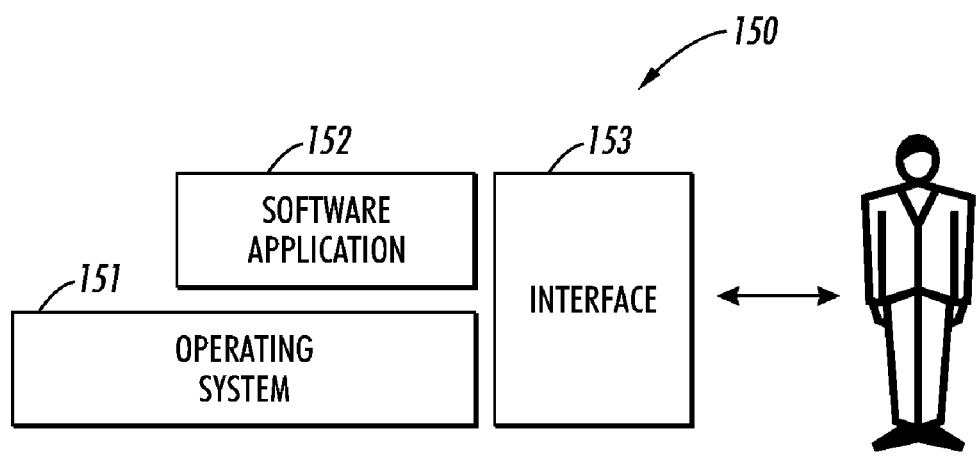
FIG. 2 illustrates a schematic view of a software system including an operating system, application software, and a user interface for carrying out the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied and/or implemented in the context of a data-processing system 100 that includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices, such as a rendering device 108, may be utilized association with the data-processing system 100 as desired. As illustrated, the various components of the data-processing system 100 communicate through a system bus 110 or similar architecture.

FIG. 2 illustrates a computer software system 150 provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), also serves to display results, whereupon the user may supply additional inputs or terminate the session. In one particular embodiment, operating system 151 and interface 153 can be implemented in the context of a "Windows" system. In another embodiment, operating system 151 and interface 153 may be implemented in the context of other operating systems, such as Linux, UNIX, etc. Application module 152, on the other hand, can include instructions, such as the various operations described herein with respect to the various components and modules described herein, such as, for example, the method 300 depicted in FIG. 3.

The following description is presented with respect to embodiments of the present invention, which can be embodied in the context of a data-processing system such as data-processing system 100 and computer software system 150 depicted respectively in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Note that the disclosed embodiments generally discuss the use of VI and PDL information. One non-limiting example of the use of VI and PDL information is disclosed in U.S. Patent Publication No. US20080222522A1 entitled "Method of background form print submission for document enhancement" by inventor Javier A. Morales, which was published on Sep. 11, 2008 and is incorporated herein by reference in its entirety.

Figure 3:
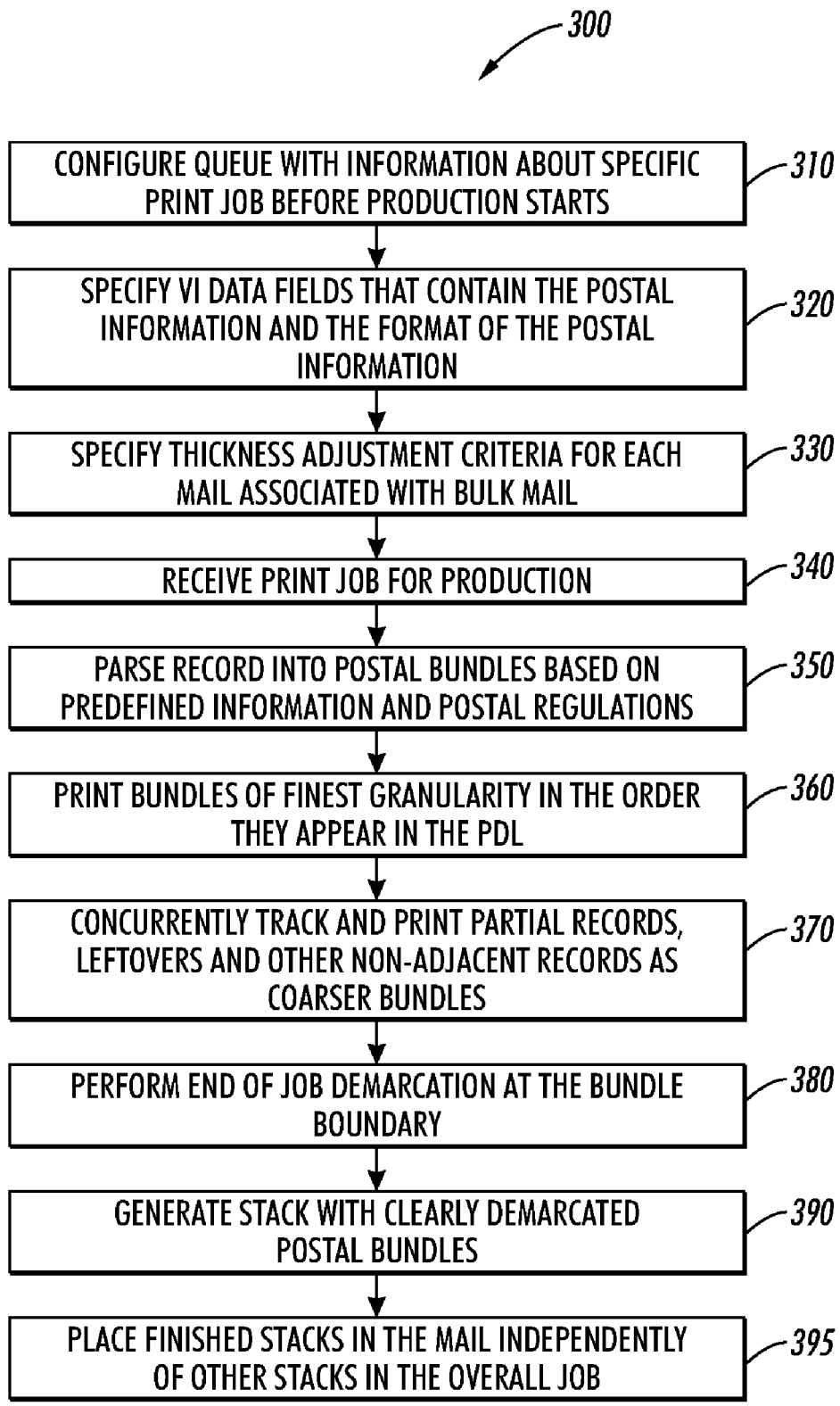
FIG. 3 illustrates a detailed flow chart of operations illustrating logical operational steps of a method for bulk mail oriented transaction printing based on postal regulation compliance, in accordance with a preferred embodiment.

FIG. 3 illustrates a detailed flow chart of operations illustrating logical operational steps of a method 300 for bulk mail oriented transaction printing based on postal regulation compliance, in accordance with a preferred embodiment. Note that the method 300 can be implemented in the context of a computer-useable medium that contains a program product. The method 300 depicted in FIG. 3 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 300 described herein can be deployed as process software in the context of a computer system or data-processing system as that depicted in FIGS. 1-2.

The process begins, as indicated at block 310, with the configuring of a queue. Note that as utilized herein, the term queue generally refers to a particular kind of collection in which the entities in the collection are kept in order and the principal (or only) operations on the collection are the addition of entities to the rear terminal position and removal of entities from the front terminal position. Such a queue can be provided in the context of a First-In-First-Out (FIFO) data structure. In such a FIFO data structure, the first element added to the queue will be the first one to be removed. This is equivalent to the requirement that whenever an element is added, all elements that were added before have to be removed before the new element can be invoked. Such a queue generally constitutes a linear data structure, although other types of data structures (e.g., circular) may be implemented. A "queue", as discussed herein, can also be utilized to process various entities such as data, objects, or other events, which are stored and held to be processed later. In such a context, the queue can perform the function of a buffer. The "queue" described herein can also be implemented as a data structure coupled one or more access routines, as an abstract data structure or in an object-oriented language.

Figure 4:
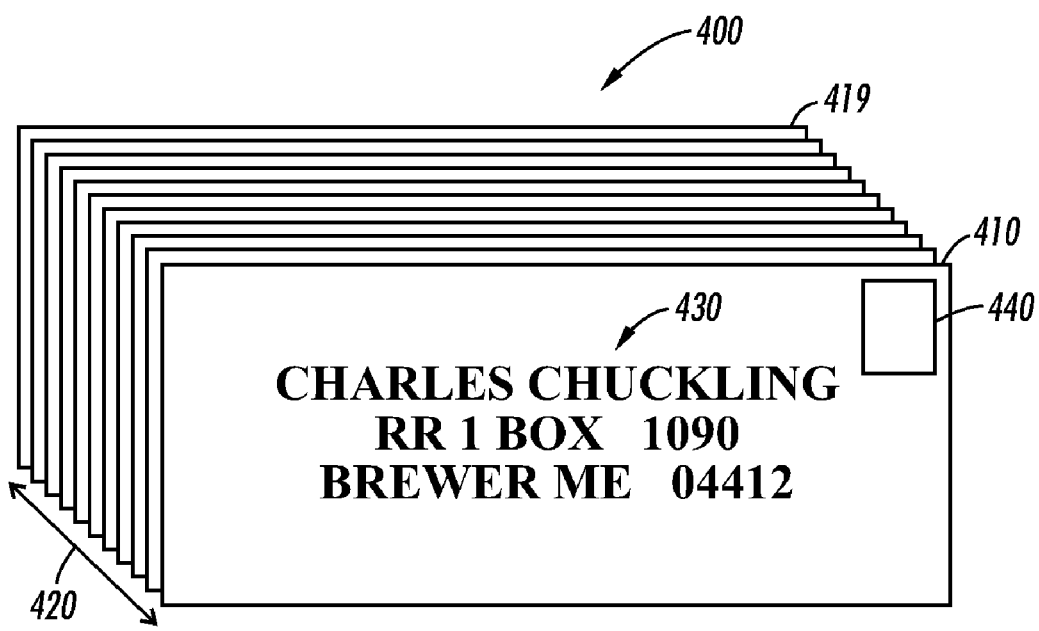
FIG. 4 illustrates an exemplary view of a postal bundle, which can be implemented in accordance with a preferred embodiment.

The queue can be configured either in a DFE (Digital Front End) or an upstream system such as, for example, an output manager with information regarding a specific print job before production starts, as depicted at block 310. Thereafter, a number of VI data fields 430, as shown in FIG. 4, that contain postal information and the format of the postal information of the print job can be specified, as depicted at block 320. The required postal information typically includes, but is not limited to, state and zip postal codes. The postal information format may be, for example, USPS, Canada Post, etc. It can be appreciated that although the discussion provided herein generally refers to the USPS by way of example, the disclosed method and system can be utilized by postal systems and distribution networks (both governmental and private) in any number of countries and geographical regions and is not limited to the USPS. The USPS is merely one example in which the disclosed method and system may be implemented for improving postal delivery and bundling efficiencies.

Variable information rendering (e.g., printing) combines a predefined document layout with a combination of static and dynamic text and graphic elements to create one-of-a-kind pages at an extremely high speed. Thereafter, as depicted at block 330, a thickness adjustment for each piece of bulk mails 410 and 419, as shown in FIG. 4, can also be specified, which includes the estimated thickness of the envelope and post-print inserts along with a specification of folding type of printed content. The specification of the data field can be accomplished manually or by parsing a sample file and selecting the source for the data. Note that the estimated thickness of each item or piece of mail can be based on qualities associated with the envelope itself including, for example, the number of pages within the envelope, the insert thickness, folding, etc.

The print job can be received for production, as illustrated at block 340. The records in the print job can be parsed based on the predefined postal information and well-known postal regulations, as depicted at block 350. Note that the data-processing system 100 can be configured to function as rendering (e.g., printing) or output management system that is "aware" of production details associated with the print job.

The output management system 100 can enhance the post office or other postal delivery organization (e.g., Federal Express, UPS, etc) sorting capabilities by taking into account the production information that can impact the thickness of the finished item of mail (e.g. the thickness of inserts, the envelope and the mail piece proper, thickness of media, number of pages for each piece and the number of folds, etc). The production system 100 can utilize the above-specified information to determine a much more accurate number of records for a particular bundle rather than sorting the records so that bundles are homogeneous. Such an approach enables each bundle to contain as close to the maximum number of pieces (based on thickness) as possible. The VI records can be printed in an order other than the order specified in the VI PDL in order to enable the dynamic creation of coarser bundles. The predefined variable information can be utilized to fit records into the bundles.

The bundles of a finest granularity can be printed in an order as they appear in the PDL (Print Description Language), as illustrated at block 360. The leftovers and partial bundles can be combined into a single, coarser granularity bundle. The number of partial bundles and leftovers that can really be combined into a single, coarser bundle can be determined previously. The partial records, leftovers and other non-adjacent records can be concurrently tracked and printed as coarser bundles, as depicted at block 370. The coarser bundles can be rendering as soon as possible, but not between finer granularity bundles that are intended to be sent to the same destination. Such rules can be utilized for sorting records so they can be bundled easily utilizing well-known postal rules. In addition, a collection of VI records as a single unit can be tracked and the unit can be treated as an independent print job.

FIG. 4 illustrates an exemplary view of a postal bundle 400, which can be implemented in accordance with a preferred embodiment. The postal bundle 400 depicted in FIG. 4 represents a collection of various mail items, such as items 410 and 419 with approximately similar destination address. The items 410 and 419 can be printed by evaluating the zip code data in the VI PDL based on postal regulation compliance such as, for example, a stamp 440 attached to the top right corner and an address field 430 located at the center, and the like. The address fields 430 constitute the VI data fields that can be altered from one mail item to the other. The thickness 420 of the postal bundle 400 can be a predetermined value set according to postal regulations. Note that the embodiments discussed herein should not be construed in any limited sense. That is, it can be appreciated that such embodiments reveal details of the structure of an exemplary form necessary for a better understanding of the invention and may be subject to change by skilled persons within the scope of the invention without departing from the concept thereof.

Figure 5:
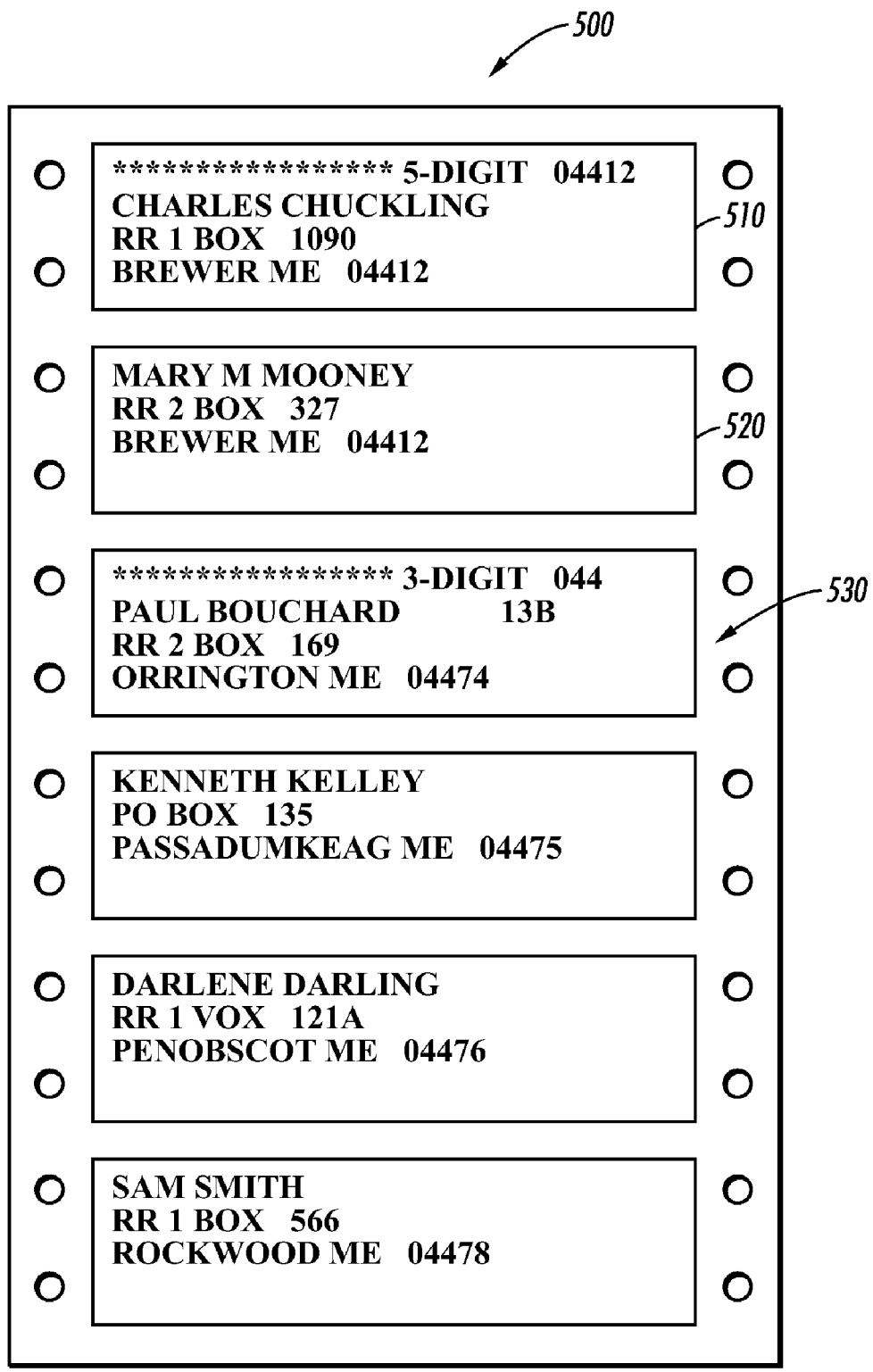
FIG. 5 illustrates an exemplary view of a cover sheet for each of the postal bundles, which can be implemented in accordance with a preferred embodiment.

Further, the end of job demarcation at the boundary of the bundle 400 such as, for example, offset, slip-sheet, and cover sheet, etc. can be performed, as depicted at block 380. The end of job demarcation simplifies the mailroom workflow since the bundle demarcations have already been defined. The cover sheets can also be created for each of the mail bundles. FIG. 5 illustrates an exemplary view of a cover sheet 500 for each of the postal bundles 400, which can be implemented in accordance with a preferred embodiment. As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

The VI data fields 430 specified for each item 410 and 419 can be stored as a single unit in a database. The single unit can be utilized for variable-information printing (VIP) on the bundle boundary such as a cover sheet 500. The content of such cover sheets 500 can be tied to a specified postal system and are compliant with postal regulations. This includes not only formatting and placement of items, but information from the VI records in the bundle 400. The address on the cover sheet 500 indicate the bulk mails that are present in the postal bundle 400 such as, for example, first two rows 510 and 520 indicate the existence of 5-digit bulk mails and the remaining rows indicates the existence of 3-digit bulk mails, as indicated by the arrow 530. Therefore, the cover sheet 500 comprising various addresses can be bounded to the postal bundle 400 to obtain a complete postal compliance bulk mail format. It can be appreciated that the method 300 described herein can be configured to follow various postal compliances.

A stack can then be generated after rendering with clearly demarcated postal bundles, as illustrated at block 390. The finished stacks can be placed in the mail independently of other stacks in the overall job, as depicted at block 395. For example, as shown in FIG. 5, USPS bundles can include a 5-digit zip code for 5 digit bundles, a first 3 digits of zip code for 3 digit bundles and state abbreviation+"mixed" (e.g. NY mixed) for state mixed bundles, "Mixed States" for multi-state bundles and "Foreign Mail" for international mail.

The method 300 described herein implements postal sorting as part of print production. The postal bundles such as bundle 400 can be defined and tracked during production. The production information can be utilized to determine each mail piece's thickness and the information can be utilized to create bundles that are always as thick as possible. The print order of VI records can be altered so that bundles can be printed by granularity. The scheduling of printing for the VI records does not break the contiguity of other bundles that can go to the same destination and can be potentially bagged together for further savings. Also, job constructs (e.g. cover pages, offset, slip sheets, etc.) can be applied to the bundles 400. The cover sheet 500 includes VI PDL data and can be tailored to specific postal requirements.

It is believed that by utilizing the system and approach described herein, the mailing costs can be reduced since the number of pieces on each bundle is not fixed but rather varies with the variability in the thickness of the mail pieces and by combining small bundle "leftovers" into larger bundles. Further, the printed bundles that go into the bindery are independent of each other and the bindery does not need to ensure retention of the FIFO print order, which simplifies bindery operations and mailroom workflow. Also, the mailroom does not need to collate post office cover sheets into the mail bundles. Mailroom work can also be reduced to rubber banding and bagging.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for bulk printing and mailing of mail-able items comprising:
   receiving a job having records of the mail-able items and data related to predefined postal guidelines, the records having variable information comprising postal delivery information and thickness information for mail-able items, by executing a first program instructions compatible with print description language by a computer system;
   configuring a print-mail Job queue based on the records by grouping the records of the job such that the individual mail items are sortable into postal bundles based on granularity and the predefined postal guidelines by executing second program instructions by the computer system;
   printing the mail-able item by executing a print description language format on the computer system;
   sorting the mail-able items into bundles based on granularity of the variable information to create bundles with different granularities by executing a third program instructions;
   tracking granularity of the bundles, partial bundles and leftover mail-able items;
   identifying an end of job demarcation at a boundary of said at least one postal bundle to produce a demarcated postal bundle
   generating a stack of bundles based on demarcated boundaries of the postal bundles; and
   sending a first stack of a first granularity independently of sending a second stack having a second granularity in the job.

2. The method of claim 1 wherein sorting further comprises calculating a number mailers to be placed in a bundle based on the thickness information in the records.

3. The method of claim 2, further comprising:
   printing records with a finer granularity in the order the records appear in the print description language by executing instructions in print description language format; and
   tracking the coarser granularity records among finer granularity records
   delaying printing of records of coarser granularity until at least a group of finer granularity records are printed wherein printing is performed concurrently with the sorting.

4. The method of claim 3, further comprising:
   sorting said each mail-able item that does not fit into a smallest granularity bundle with said plurality of partial records and leftover mail-able item creating at least one coarser bundle.

5. The method of claim 1 further comprising:
   formatting and printing a plurality of discrete data fields and said postal information on said coversheet.

6. The method of claim 5 further comprising:
   formatting and printing a plurality of discrete data fields and said postal information on said coversheet.

7. The method of claim 5 wherein said coversheet is configured in accordance with postal regulations.

8. The method of claim 1 wherein said at least one bundle comprises a maximum number of mail-able items based on the postal regulations and a thickness of each mail-able item in the bundle.

9. The method of claim 8 further comprising:
   determining said thickness of each mail-able item within said at least one bundle; and
   utilizing said thickness of each mail-able item to determine an overall thickness of said at least one bundle.

10. The method of claim 1 wherein said postal information includes a zip code.

11. The method of claim 1 wherein said end of job demarcation at said boundary of said at least one postal bundle is indicated by an offset sheet.

12. The method of claim 1 wherein said end of job demarcation at said boundary of said at least one postal bundle is indicated by a slip-sheet.

13. A system for bulk mail oriented transactions for pieces of mail, said system comprising:
   a processor;
   a data bus coupled to said processor; and
   a computer-usable medium embodying print description language type computer code, said computer-usable medium being coupled to said data bus, said computer code comprising instructions that when executed by said processor will cause receiving a job having records of the mail-able items and data related to predefined postal guidelines, the records having variable information comprising postal delivery information and thickness information for mail-able items, by executing a first program instructions compatible with print description language by a computer system;

administrating a queue with data sets related to a job, wherein said data sets include postal information and thickness data with respect to the pieces of mail associated with the job;

automatically parsing the data sets associated with said job to define at least one postal bundle based on the postal information and data in said datasets;

printing the mails by executing a print description language format on the computer system;

sorting the mailers into bundles based on granularity of the data sets to create bundles with different granularities by executing a third program instructions tracking granularity of the bundles, partial bundles and leftover mail-able items;

identifying an end of job demarcation at a boundary of said at least one postal bundle to produce a demarcated postal bundle and generating a stack including said demarcated postal bundle wherein said stack is capable being automatically sent to a carrier independently of other stacks of the overall job.

14. The system of claim 13 wherein said instructions are further configured to receive said job after configuring said queue with data related to said job.

15. The system of claim 13 wherein said postal information includes a zip code.

16. The system of claim 13 wherein said end of job demarcation at said boundary of said at least one postal bundle includes at least one of the following: an offset sheet, a slip-sheet and/or a coversheet.

17. A non-transitory computer-usable medium for bulk mail oriented transactions having documents, said computer-usable medium embodying computer program code, said computer program code comprising computer executable instructions configured to:

set up a queue with records related to a rendering job, wherein said records include postal information in association with a plurality of variable data fields and thickness information with respect to each piece of mail associated with bulk mail;

automatically parsing records associated with said rendering job into at least one postal bundle based on postal regulations and said records;

printing the mailers by executing a print description language format on the computer system;

sorting the mailers by executing a print description language format on the computer system;

sorting the mailers into bundles based on granularity of the data sets to create bundles with different granularities by executing a third program instructions;

tracking granularity of the bundles, partial bundles and leftover mail-able items;

performing an end of job demarcation at a boundary of said at least one postal bundle in order to produce a demarcated postal bundle from said at least one postal bundle and generating a stack including said demarcated postal bundle, wherein said stack is capable of being automatically sent independently of other stacks of an overall job.

18. The non-transitory computer-usable medium of claim 17, wherein said computer program code further comprises computer executable instructions configured to receive said rendering job after configuring said queue with the records.

19. The non-transitory computer-usable medium of claim 17 wherein said postal information includes a zip code.

20. The non-transitory computer-usable medium of claim 17 wherein said end of job demarcation at said boundary comprises at least one of the following: an offset sheet, a slip-sheet and/or a coversheet.

* * * * *